(12) United States Patent
Szczepanik et al.

(10) Patent No.: US 11,119,763 B2
(45) Date of Patent: Sep. 14, 2021

(54) COGNITIVE SELECTION OF SOFTWARE DEVELOPER FOR SOFTWARE ENGINEERING TASK

(71) Applicant: International Business Machines Corporation, Armonk, NY (US)

(72) Inventors: Grzegorz P. Szczepanik, Cracow (PL); Tomasz Hanusiak, Cracow (PL); Jaroslaw Osinski, Mrozy (PL); Konrad W. Komnata, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,951

(22) Filed: Nov. 27, 2018

(65) Prior Publication Data
US 2020/0167156 A1 May 28, 2020

(51) Int. Cl.
*G06F 8/77* (2018.01)
*G06F 16/9535* (2019.01)

(52) U.S. Cl.
CPC ............ *G06F 8/77* (2013.01); *G06F 16/9535* (2019.01)

(58) Field of Classification Search
CPC .... G06F 8/00–38; G06F 8/77; G06F 16/9535; G06F 8/71; G06Q 10/06311–063118
See application file for complete search history.

(56) References Cited

U.S. PATENT DOCUMENTS

| | | | | |
|---|---|---|---|---|
| 7,159,206 B1 * | 1/2007 | Sadhu | ................... | G06Q 10/06 717/101 |
| 7,853,489 B2 * | 12/2010 | Bess | ................ | G06Q 10/06311 705/26.4 |
| 8,185,515 B2 * | 5/2012 | Lavine | ................ | G06F 16/2455 707/710 |
| 8,356,278 B2 * | 1/2013 | Drissi | ...................... | G06F 8/36 717/101 |
| 8,380,555 B2 * | 2/2013 | Kohler | ........... | G06Q 10/063116 705/7.25 |
| 8,464,217 B2 * | 6/2013 | Janczewski | ............... | G06F 8/45 717/116 |

(Continued)

OTHER PUBLICATIONS

Blikstein, Paulo. "Using learning analytics to assess students' behavior in open-ended programming tasks." Proceedings of the 1st international conference on learning analytics and knowledge. 2011. (Year: 2011).*

(Continued)

*Primary Examiner* — Matthew J Brophy
(74) *Attorney, Agent, or Firm* — Peter K. Suchecki (57) ABSTRACT

A computer receives a software engineering task to be carried out by a developer. The computer receives a description record comprising information regarding the software engineering task, wherein the description record includes information on a code area to be affected by the software engineering task. The computer queries a knowledge base based on the code area, the knowledge base comprising at least one relationship between an identity of a developer, a first electronic report comprising at least a user feedback and a code area changed by this developer. The computer selects, based on a result of said querying, one or more developers to carry out the software engineering task.

14 Claims, 3 Drawing Sheets

(56) References Cited

U.S. PATENT DOCUMENTS

| | | | |
|---|---|---|---|
| 8,635,094 B2* | 1/2014 | Hubbard | G06Q 10/06 705/7.11 |
| 8,930,882 B2* | 1/2015 | Herbert | G06F 8/10 717/101 |
| 9,104,997 B1* | 8/2015 | Balasubramanian | G06Q 50/01 |
| 9,158,502 B2* | 10/2015 | Howard | H04L 51/14 |
| 9,305,277 B2* | 4/2016 | Herbert | G06F 8/70 |
| 9,614,784 B1* | 4/2017 | Houston | H04L 47/823 |
| 9,665,826 B2* | 5/2017 | Jain | G06F 16/2465 |
| 9,710,260 B2* | 7/2017 | Herbert | G06F 8/10 |
| 9,811,792 B2* | 11/2017 | Balasubramanian | G06F 8/71 |
| 9,858,544 B2* | 1/2018 | Balasubramanian | G06Q 50/01 |
| 10,042,636 B1* | 8/2018 | Srivastava | G06Q 10/06 |
| 10,120,658 B2* | 11/2018 | Jing | G06F 8/36 |
| 10,248,919 B2* | 4/2019 | Shuster | G06Q 10/06311 |
| 10,310,968 B2* | 6/2019 | Biddle | G06F 11/3616 |
| 10,574,591 B1* | 2/2020 | Houston | H04L 67/1012 |
| 2002/0156668 A1* | 10/2002 | Morrow | G06Q 10/063114 705/7.14 |
| 2004/0107125 A1* | 6/2004 | Guheen | G06Q 99/00 705/319 |
| 2007/0118433 A1* | 5/2007 | Bess | G06Q 30/0617 705/7.13 |
| 2009/0299808 A1* | 12/2009 | Gilmour | G06Q 10/06 705/7.23 |
| 2010/0251155 A1* | 9/2010 | Shah | G06Q 10/0633 715/771 |
| 2011/0035728 A1* | 2/2011 | Janczewski | G06F 8/314 717/116 |
| 2011/0099041 A1* | 4/2011 | Laljiani | G06Q 10/0631 705/7.17 |
| 2011/0166969 A1* | 7/2011 | Hughes | G06Q 10/063112 705/30 |
| 2012/0317537 A1 | 12/2012 | Komar | |
| 2014/0019933 A1* | 1/2014 | Balasubramanian | G06F 8/20 717/102 |
| 2014/0101631 A1* | 4/2014 | Hughes | G06Q 10/063112 717/101 |
| 2014/0165027 A1* | 6/2014 | Herbert | G06Q 10/063112 717/101 |
| 2014/0344773 A1* | 11/2014 | Howard | H04L 51/18 717/100 |
| 2015/0006519 A1* | 1/2015 | Jain | G06F 40/289 707/723 |
| 2015/0324731 A1* | 11/2015 | Balasubramanian | G06Q 10/063112 717/102 |
| 2015/0324732 A1* | 11/2015 | Balasubramanian | G06F 8/71 717/102 |
| 2015/0379472 A1* | 12/2015 | Gilmour | G06Q 10/06 705/7.15 |
| 2016/0019484 A1* | 1/2016 | Srivastava | G06Q 10/063118 705/7.17 |
| 2016/0171404 A1* | 6/2016 | Mukherjee | G06Q 10/06313 705/7.14 |
| 2016/0179506 A1* | 6/2016 | Herbert | G06Q 10/063112 717/101 |
| 2016/0224908 A1* | 8/2016 | Jagannathan | G06Q 10/063 |
| 2016/0364675 A1* | 12/2016 | Sharma | G06Q 10/1097 |
| 2017/0132545 A1 | 5/2017 | Michaely | |
| 2017/0371626 A1* | 12/2017 | Abebe | G06Q 10/06313 |
| 2018/0081683 A1* | 3/2018 | Shuster | G06Q 10/10 |
| 2018/0101809 A1* | 4/2018 | Bnayahu | G06Q 10/10 |
| 2018/0129483 A1* | 5/2018 | Biddle | G06Q 10/06 |
| 2019/0066016 A1* | 2/2019 | Ghosh | G06Q 10/06313 |
| 2019/0138171 A1* | 5/2019 | Krishnan | G06F 3/0484 |
| 2019/0138600 A1* | 5/2019 | Krishnan | G06F 3/0482 |
| 2020/0050996 A1* | 2/2020 | Generes, Jr. | G06Q 10/063112 |

OTHER PUBLICATIONS

González-Torres, Antonio, et al. "Knowledge discovery in software teams by means of evolutionary visual software analytics." Science of Computer Programming 121 (2016): 55-74. (Year: 2016).*

Jonsson, Leif, et al. "Automated bug assignment: Ensemble-based machine learning in large scale industrial contexts." Empirical Software Engineering 21.4 (2016): 1533-1578. (Year: 2016).*

* cited by examiner

COGNITIVE SELECTION OF SOFTWARE DEVELOPER FOR SOFTWARE ENGINEERING TASK

BACKGROUND

The present disclosure relates to the field of digital computer systems, and more specifically, to a selection of a software developer for a software engineering task.

Software development systems do not have the same set of development quality criteria. It is a common practice to create specialization areas for the software development systems and for the products they are working on. For complex areas, many different software development systems may be required, and the choice of the right development system may be challenging from a technical point of view.

SUMMARY

Disclosed herein are embodiments of a method, system, and computer program product for selection of a software developer. A computer receives a software engineering task to be carried out by a developer. The computer receives a description record comprising information regarding the software engineering task, wherein the description record includes information on a code area to be affected by the software engineering task. The computer queries a knowledge base based on the code area, the knowledge base comprising at least one relationship between an identity of a developer, a first electronic report comprising at least a user feedback and a code area changed by this developer. The computer selects, based on a result of said querying, one or more developers to carry out the software engineering task.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. In the following, embodiments of the invention are explained in greater detail with reference to the drawings.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

When developing software, different software developers can have different skills, strengths, and experience. Choosing a software developer for a software engineering task, which can include creation of new software or modifying an exist software project, can be difficult. Selection of a software developer who is not the optimal choice can result in inefficiencies and/or a product which suffers during quality assurance testing and/or once deployed to customers or users.

Embodiments of the present disclosure may enable a rich database of information on software development that may be used by a cognitive solution to automatically identify or select one or more appropriate developers for a received task. Selection of one or more appropriate developers can include selecting the best developers for a software engineering task. The information stored in the database may go beyond user considerations and may include technical aspects of software development, which a user may not consider when seeking a developer.

In some embodiments, a knowledge base can be used which contains information on developers and development projects. In some embodiments, querying the knowledge base may, for example, result in multiple developers that are associated with a code area that will be created or changed. Selecting one or more developers to be assigned to a task may, for example, be performed using the content of an electronic report associated with each of the multiple developers. As used herein, a recently changed code area may be a code area that has been changed within a predefined time period (e.g., in the most recent month). User feedback on a product can comprise or involve feedback on a recently changed code area.

An electronic report may, for example, comprise values of multiple properties and/or quality parameters (or simply "parameters"). The properties may comprise the delivery time of a given task of changing or creating a code, the network bandwidth required by the developer to create or change a code area, the quality of the developed code (e.g., as determined by the number of bugs etc.). The types of properties and associated values will vary in embodiments. An electronic report and its property and/or parameter contents may enable a selection of a developer that is beyond normal user selection criteria. For example, a developer that may be selected by a user for a given task may be rejected when using this information based, for example, on the current status of the network load which the normal user would not consider. A software product may comprise software implementable instructions and/or data for carrying out a predefined method or task. The instructions may be organized in modules or packages or separate files such as headers and implementation files. The code area may, for example, indicate at least part of the software product such as a module, package or file.

For example, the electronic report may include information that is technical that indicates how many processing resources are used by the developer to develop a given code area. For another example, the electronic report may comprise information on the network traffic (network bandwidth) that is required by the developer to perform the development (e.g., a developer that works with a networked group of developers would require more network communication than a developer that develops code alone). Using this information, some embodiments of the present disclosure may select a developer that a user may not select. For example, the developer that may be selected by an embodiment of the present disclosure may be the one that consumes less network bandwidth although another developer that consumes more bandwidth may be better in view of a user. In some embodiments, the selection may, for example, be performed based on the current status of a computer system or network environment. For example, if the network is overloaded, the selection of the developer may be based, in whole or in part, as exemplified above on the network usage of the developer. In another example, the developer who provides developed codes areas consuming less than a predefined maximum memory may be selected.

According to some embodiments, the knowledge base comprises conversation information related to a conversation that took place between the developer and the user. The electronic report may comprise the information of the knowledge base that may be used for the selection of the developer. The conversation information may, for example, further indicate the network bandwidth that has been used for performing a given task for a code area and/or the types of network connections used for the conversations. This information may be advantageous as it may enable selection of a developer that may involve less network resource consumptions.

In another example, the conversation information may include a conversation that is used or involved for describing the received task or feedback. In such an example, the longer the conversation the more complex the task because a longer conversation can indicate the task is more complicated since it required more words to describe. Conversely, a shorter conversation could indicate a simple task. In this example, the knowledge base may further comprise a time duration, word count, or other measure of this conversation.

According to some embodiments, the knowledge base comprises information related to a time required to develop the code or change a code area. For example, the time required to develop the code or change the code area may be the time between receiving a request to develop the code or change the code until the code is delivered. This time is an indication of the processing time required for developing the code or changing the code. The processing time involves processing recourses of computer systems and thus it may be a reliable indicator for selecting a developer. A developer who involves less processing resources (e.g., the developer uses a single computer instead of a network of computers for developing the code) may be selected.

According to some embodiments, the knowledge base comprises at least one quality metric calculated from the electronic report, the time required to change the code area, the conversation information, and/or any other relevant information contained within the knowledge base. This may enable a systematic and automatic approach for selecting developers based on a comparison of single metric values with thresholds that may be chosen based on technical considerations such as network statuses. The quality metrics may for example be the quality parameters. For example, if the current network status is a busy status, the developer to be chosen may be the one that involves less network communications although this choice may not be considered by a normal user (e.g., a normal user may choose the best developer that provides the code in a working state regardless if that best developer involves higher amount of network communications).

According to some embodiments, a revision control system on which one or more versions of the code area are stored can be accessed and used in determining which developer to use for a software engineering task. This may, for example, enable identification of or determining a characteristic of the code area (e.g., a name of the file of the code area).

According to some embodiments, the method is automatically performed. The provision of the knowledge base and the quality metric may enable an efficient and automatic processing of the developer selection.

According to some embodiments, the querying results in a list of developers for the software engineering task, wherein the selection of the developer comprises determining a current status of processing resources required for a software development of a code area, comparing the current status with an amount of processing resources usage associated with each developer of the list, and selecting the developer whose amount of processing resources matches the current status. The electronic report associated with each developer in the knowledge base may be used for performing the selection. The electronic report may comprise an indication of the amount of processing resources usage that is required by each of the developers to perform the development (changes or creation) of the code area. The amount of processing resources may, for example, indicate the amount of network bandwidth used for developing the code area by the developer. The current status may for example indicate that the network is overloaded for the next few hours or days or months and thus the selected developer may be the one that consumes the lowest network bandwidth compared to the other developers, although this selected developer may have a worse value of another metric such as the number of bugs etc.

Figure 1:
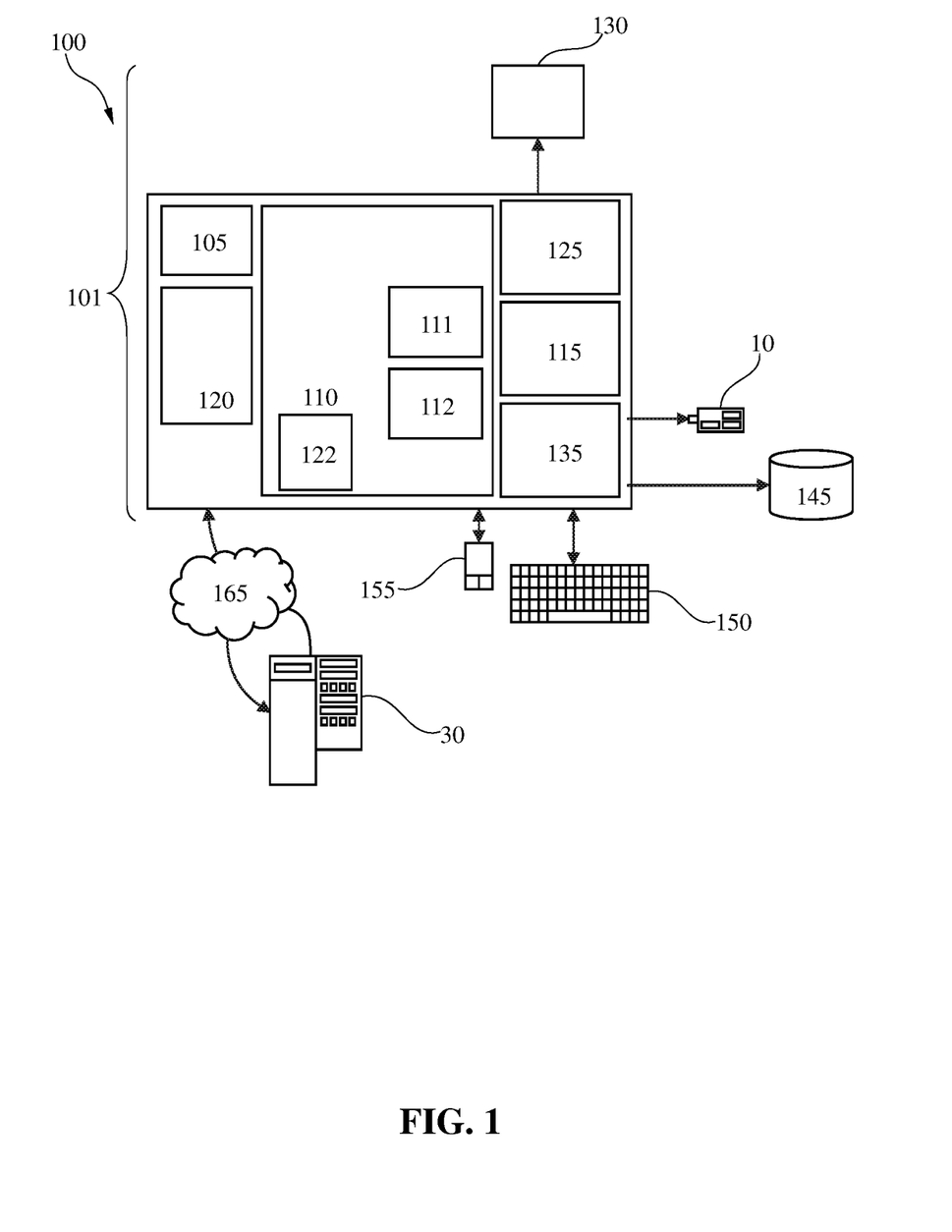
FIG. 1 illustrates a block diagram of a computerized system, in accordance with some embodiments of the present disclosure.

FIG. 1 illustrates a block diagram of a computerized system, in accordance with some embodiments of the present disclosure. System 100, including general-purpose computer 101, can be a system suited for implementing method steps as involved in the disclosure.

It will be appreciated that the methods described herein are at least partly non-interactive, and automated by way of computerized systems, such as servers or embedded systems. In example embodiments though, the methods described herein can be implemented in an interactive or partially interactive system. These methods can further be implemented in software 112, firmware (including BIOS 122), hardware (processor) 105, or a combination thereof. In example embodiments, the methods described herein are implemented in software, as an executable program, and are executed by a special or general-purpose digital computer, such as a personal computer, workstation, minicomputer, or mainframe computer. The most general system 100 therefore includes a general-purpose computer 101.

In example embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), or programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions 112 (e.g., instructions to manage databases such as a database management system and/or instructions to select a developer for a software engineering task).

The software in memory 110 can also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When in the form of a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In example embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can include any generalized cryptographic card or smart card known in the art. The system 100 can further include a display controller 125 coupled to a display 130. In example embodiments, the system 100 can further include a network interface (not depicted) for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

Figure 2:
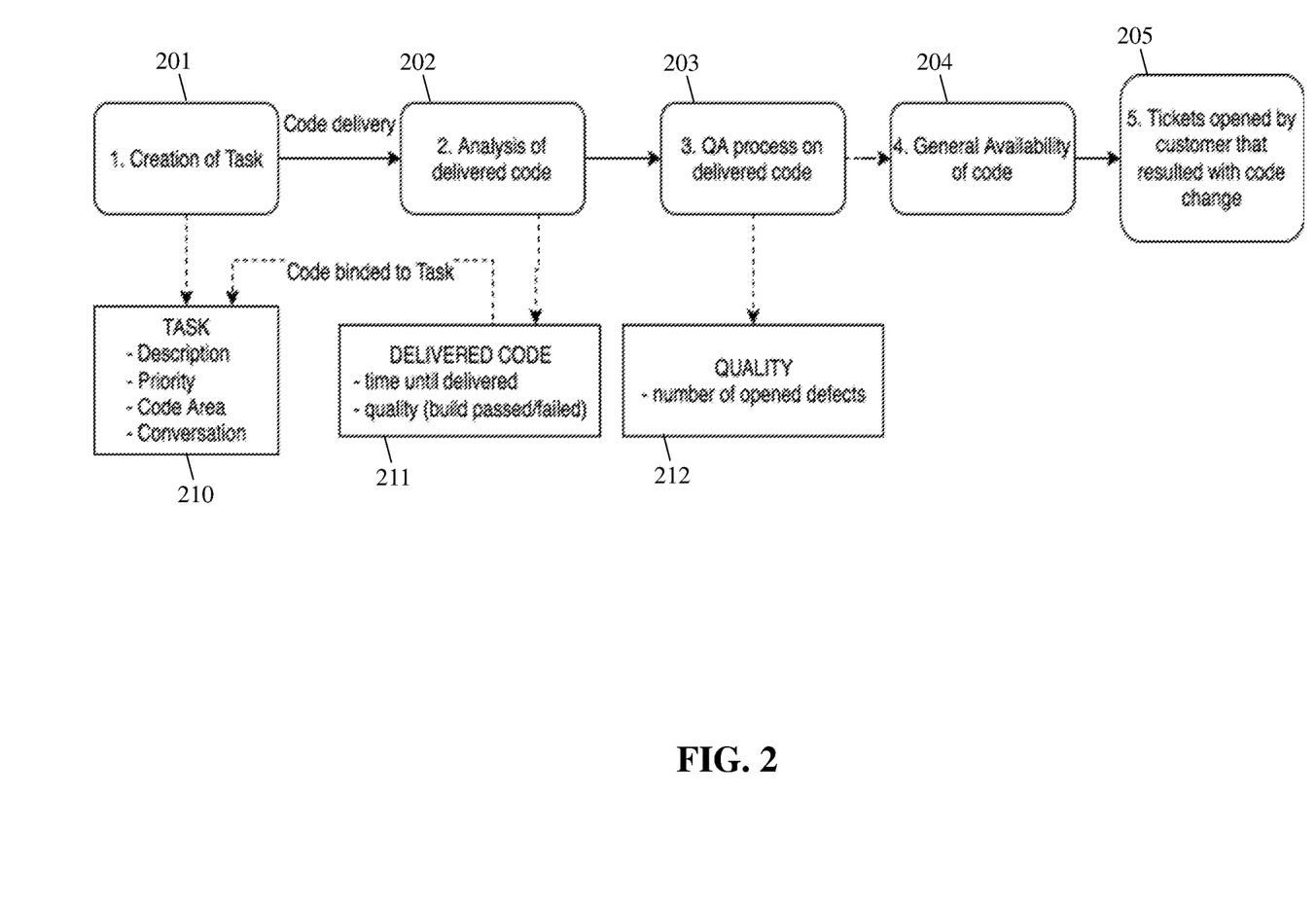
FIG. 2 is a flow diagram indicating example phases of software development, in accordance with some embodiments of the present disclosure.

FIG. 2 is a flow diagram indicating example phases of a software development process that may be used by embodiments of the present disclosure to build the knowledge base, in accordance with some embodiments of the present disclosure. One or more methods of FIGS. 3 and 4 can utilize information in the knowledge base.

The software development process may start by the creation of a task (block 201). The task may be a software engineering task. The task may be defined by multiple task parameters as listed in the block 210. The task parameters may, for example, comprise a description of the task (e.g., a value indicating whether it is a change of a code or creation of a code), the priority indicating the priority of the task (e.g., a value 0 may indicate the lowest priority and 10 may be the highest priority), the code area that is concerned by the task, and a parameter indicative of the conversation related to the task (e.g., the time duration of the conversation).

When a developer has written some code, that code can be added to a main code stream of a product and builds can be triggered and show if tests have passed. For example, after the task has been completed by the developer and the developer has delivered the code, an analysis of the developed code may be performed (block 202). The analysis of the developed code may, for example, comprise the evaluation of development parameters listed in block 211. The development parameters may, for example, comprise the time spent between the creation of the task until the delivery time of the code (e.g., the time spent between blocks 201 and 202). The development parameters may further comprise a development quality parameter that indicates whether the build is passed or failed. The "build" stands for a process of building (e.g., compiling) a software (e.g., from a modified source) into a ready to use software package.

Then, after a passed build, a new feature may be tested by a quality assurance (QA) team (block 203). For example, testing by a QA team can lead to finding bugs in that code, the bugs are reported, and the developer should fix the bugs. The QA process of block 203 may comprise the evaluation of QA parameters as listed in block 212. The QA parameters may, for example, comprise the number of identified defects in the delivered code.

After the QA team confirms that the delivered code has a good quality (e.g., if the number of identified defects in the code is smaller than a predefined maximum number), it is made available (block 204) for customers.

During usage of the delivered code, customers might create support tickets (block 205) which might lead to code changes. These support tickets may result from bugs which the QA team did not detect, or which were detected, but not fixed. Support tickets can also result from a customer requesting additional or improved functionality from the code.

FIG. 2 indicates example steps of a process of creating, delivering and maintaining new features of a code. The quality metrics may, for example, comprise the task parameters 210, the development parameters 211, and the QA parameters 212, which may be stored in the knowledge base in association with the developer that performed the development of the code of the task. Other parameters may be evaluated, for example, during the development of the code how many processing resources are used to develop the code of the task. Also, the complexity of delivered code may be provided as a parameter indicating if a developer has added (changed) many or few lines of code (e.g., the same task may be implemented by different number of instructions or lines depending on the algorithm being used by the developer). The complexity may, for example, be quantified by the number of instructions or lines of the code.

Based on the workflow of FIG. 2, a cognitive software may be used to analyze how tasks were handled in the past and monitor and learn tasks being handled in the moment and corresponding data. Based on the stored data, the one or more developers may be chosen using data indicated in a newly created task (e.g., Description, Priority, Code Area and Conversation of the task). The selection of the developer(s) may be based on what is most important for a given requested task (e.g., the time of delivery or the quality or other parameters).

Figure 3:
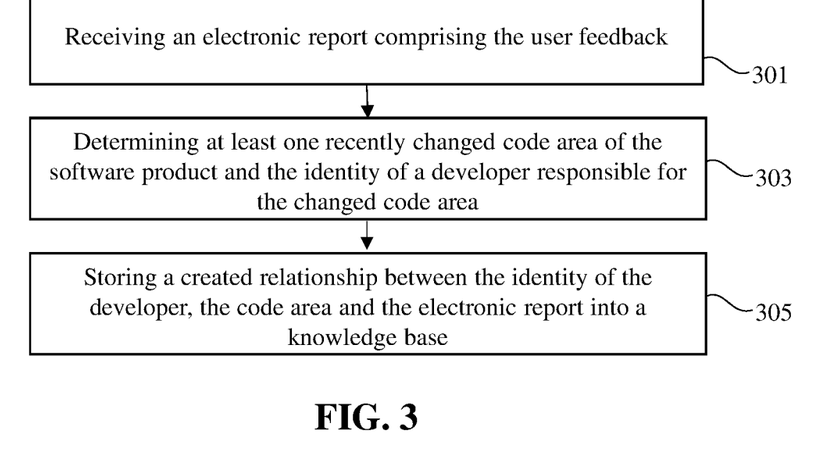
FIG. 3 is a flowchart of an example method for analyzing user feedback entered by a user of a software product into an electronic quality management system, in accordance with some embodiments of the present disclosure.

FIG. 3 is a flowchart of an example method for analyzing a user feedback entered by a user of a software product into an electronic quality management system such as system 100, in accordance with some embodiments of the present disclosure.

In block 301, an electronic report is received. The electronic report may comprise the user feedback on the software product. In some embodiments, an electronic report comprising user feedback can correspond to a ticket opened by customers in block 205 of FIG. 2. In some embodiments, an electronic report comprising user feedback can correspond to a report generated during a QA process in block 203 of FIG. 2. The electronic report may, for example, comprise multiple parameters or metrics. Each parameter is indicative of a property related to the software development. For example, a parameter may indicate the amount of processing resources used by the developer to develop a given code area of the product such as the network bandwidth required, the type of operating systems used by the developer, the amount of the CPU and memory used etc.

In block 303, at least one changed code area of the software product may be determined together with the identity of a developer responsible for the changed code area. For this purpose, a changed code area can include a new code area. For example, upon delivery of a code developed by a developer, the electronic report may automatically be received from the user and the information related to the developer of the developed code may be determined. For example, the developer information may be determined based on the code information provided in the electronic report or may be obtained from the electronic report directly where the developer is indicated in the report.

In block 305, the identity of the developer may be associated with the electronic report and the recently changed code area. A created association between the identity of the developer, the code area, and the electronic report may be stored into a knowledge base.

FIG. 3 may feed a cognitive system with information so it will be able to choose the best developer for a given task, based on the task analysis and technical considerations of the content of the knowledge base. This method may enable a proper analysis of former tasks and all the work done around that. At least part of steps 301-305 may automatically be executed.

Figure 4:
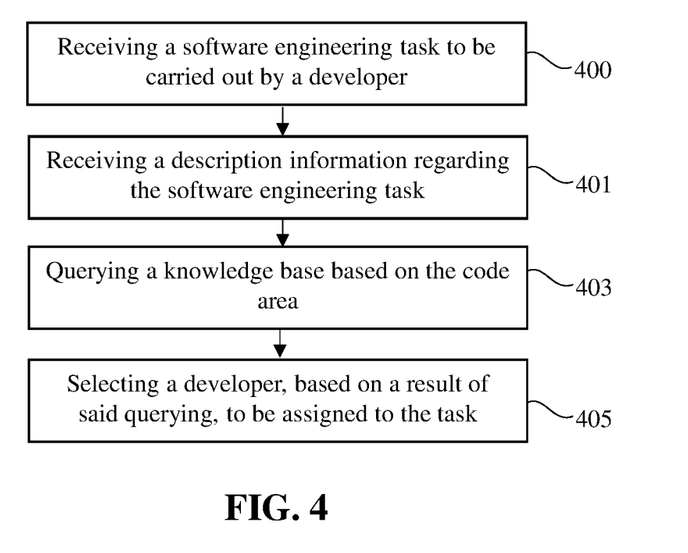
FIG. 4 is a flowchart of an example method for selection of a software developer for a software engineering task to be carried out by a developer, in accordance with some embodiments of the present disclosure.

FIG. 4 is a flowchart of an example method for selection of a software developer for a software engineering task to be carried out by a developer, in accordance with some embodiments of the present disclosure. The example method of FIG. 4 can be performed by a computer system, such as system 100, including general-purpose computer 101.

At block 400, computer system receives a software engineering task to be carried out by a developer. The software engineering task can describe a task to be carried out by a software developer in creating or modifying code. In some embodiments, the example method of FIG. 4 can be initiated in response to a ticket opened by a customer such as in block 205 of FIG. 2. For example, the user may first login into an electronic information system and may open a service request ticket and submit the ticket describing the task. In other embodiments, the example method of FIG. 4 can be used in creation of new code, such as for a new product.

When a new task is created, the task may be associated with a description of the task. For example, the description may include tags indicating code/component areas—like packages and gems, the priority of the task, and the conversation that may be used for the task. Analysis of the conversation (e.g., the time duration of the conversation) under the task may indicate the level of complexity of the task. The longer the conversation is, the more complex or unclear the task is. The level of complexity may be used to select a developer (e.g., the developer that has more experience may be selected for the more complex tasks).

In block 401, a description record describing information regarding the software engineering task is be received. For example, the software engineering task may comprise the description record. The description record includes information on which code area of the software product will be affected by the change or the new code of a software product. The description record may for example be a text file.

In block 403 and in response to receiving the description record, a knowledge base (e.g., resulting from the method of FIG. 3) may be queried based on the code area indicated in the description record. The knowledge base can include all relevant data received regarding one or more developers and previous software engineering tasks. The knowledge base can be developed using various inputs including information described above with regard to the flow diagram of FIG. 2 and electronic reports stored into a knowledge base as in block 305 of FIG. 3. The knowledge base can be continually updated to improve the content stored for future implementations of the example method of FIG. 4. As described above, the knowledge base comprises at least one relationship between an identity of a developer, an electronic report comprising user feedbacks created by a user of the software product and a code area changed by this developer.

Based on a result of said querying, a developer may be selected in block 405 to be assigned to the task. For example, the developer whose identity is associated with the code area of the description record may be selected. If there is more than one developer associated with that code area of the description record, a developer may for example randomly be selected among those developers, or a developer may be selected based on the values of the quality metrics or parameters as defined for example in FIG. 2. For example, the developer having the highest metric value may be selected. At least part of blocks 400-405 may automatically be executed.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for selection of a software developer, the method comprising:
   receiving a software engineering task to be carried out by a developer;
   receiving a description record comprising information regarding the software engineering task, wherein the description record includes information on a code area of a software product to be affected by the software engineering task;
   querying a knowledge base to generate a result based on the code area, wherein the result comprises a plurality of identities of developers who have previously made changes to the code area, and wherein the knowledge base comprises at least one relationship between an identity of a first developer, a first electronic report comprising at least a user feedback, and a code area changed by the first developer;
   determining a current status of computer system resources required for software development, wherein the computer system resources include hardware resources available to a computer system and network bandwidth;
   comparing the current status with an amount of computer system resources usage associated with each developer in the plurality of developers;
   determining that a current status of the network bandwidth has exceeded a predetermined amount of usage;
   determining that a particular developer in the plurality of developers requires less network bandwidth to complete the engineering task than other developers in the plurality of developers; and
   selecting the particular developer from the plurality of developers to carry out the software engineering task based on the result, wherein the particular developer has an amount of computer system resources that satisfies the current status.

2. The method of claim 1, wherein the knowledge base further comprises conversation information related to a conversation that took place between the first developer and a user requesting completion of the software engineering task.

3. The method of claim 1, wherein the knowledge base further comprises, for each respective developer that is associated with the code area, an amount of network bandwidth required by the respective developer to carry out the software engineering task.

4. The method of claim 3, wherein the knowledge base further comprises a quality metric calculated from one or more of the first electronic report, a time required to carry out the software engineering task, the amount of network bandwidth required to carry out the software engineering task, and other data contained within the knowledge base.

5. The method of claim 2, further comprising:
   determining a complexity of the software engineering task based, at least in part, on a length of the conversation, wherein the particular developer is selected based, at least in part, on the complexity of the software engineering task.

6. A computer program product selection of a software developer, the computer program product comprising a computer-readable storage medium having program instructions embodied therewith, the program instructions executable by a computer to perform a method comprising:
   receiving, from a user, a software engineering task to be carried out by a developer;
   receiving a description record comprising information regarding the software engineering task, wherein the description record includes information on a code area to be affected by the software engineering task, wherein the code area is selected from the group consisting of a module of the software product, a package of the software product, and a file of the software product;
   querying a knowledge base to generate a result based on the code area, wherein the result comprises a plurality of identities of developers who have previously made changes to the code area, and wherein the knowledge base comprises at least one relationship between an identity of a first developer, a first electronic report comprising at least a user feedback, and a code area changed by the first developer;
   determining a current status of computer system resources required for software development, wherein the computer system resources include network bandwidth;
   comparing the current status with an amount of computer system resources usage associated with each developer in the plurality of developers;
   determining that a current status of the network bandwidth has exceeded a predetermined amount of usage;
   determining that a particular developer in the plurality of developers requires less network bandwidth to complete the engineering task than the other developers in the plurality of developers; and
   selecting the particular developer from the plurality of developers to carry out the software engineering task, based on the result, wherein the particular developer has an amount of computer system resources that satisfies the current status.

7. The computer program product of claim 6, wherein the knowledge base further comprises information related to a time required to carry out the software engineering task, and wherein the selecting the particular developer is based further in part on a maximum amount of time to complete the software engineering task.

8. The computer program product of claim 7, wherein the knowledge base further comprises a quality metric calculated from one or more of the first electronic report, the time required to carry out the software engineering task and other data contained within the knowledge base.

9. The computer program product of claim 6, further comprising:
accessing a revision control system on which one or more versions of the code area are stored to identify a characteristic of the code area.

10. A system for selection of a software developer, the system comprising:
one or more processors; and
a memory communicatively coupled to the one or more processors,
wherein the memory comprises instructions which, when executed by the one or more processors, cause the one or more processors to perform a method comprising:
receiving, from a user, a software engineering task to be carried out by a developer;
determining, from a description record for the software engineering task, a code area of a software product to be affected by the software engineering task, wherein the code area is one or more sections of code of the software product;
determining, by querying a knowledge base that associates a plurality of developers with code areas, a list of two or more developers that are associated with previous changes to the code area of the software product, wherein the knowledge base further comprises an amount of computer system resources used by each of the two or more developers to modify the code area;
determining an amount of computer system resources available for performing the software engineering task, wherein the computer system resources include network bandwidth;
comparing the amount of computer system resources that are available with the amount of computer system resources used by each of the two or more developers to modify the code area;
determining that a current status of the network bandwidth has exceeded a predetermined amount of usage;
determining that a particular developer of the two or more developers requires less network bandwidth to complete the engineering task than the other developers on the list of two or more developers; and
selecting, from the list of two or more developers, the particular developer to carry out the software engineering task, wherein the particular developer has an amount of computer system resources that satisfies the amount of computer system resources that are available.

11. The system of claim 10, wherein the knowledge base further comprises, for each of the two or more developers, information related to a time required to carry out the software engineering task, and wherein selecting the particular developer is further based in part on which developer of the two or more developers has the smallest time required to carry out the software engineering task.

12. The system of claim 10, wherein the knowledge base further comprises, for each of the two or more developers, a quality metric calculated from one or more of the first electronic report, an amount of time required to carry out the software engineering task, and other data contained within the knowledge base.

13. The system of claim 10, wherein the computer system resources further include one or more selected from the group consisting of:
CPU resources; and
computer memory.

14. The method of claim 1, wherein the computer system resources further include one or more selected from the group consisting of:
CPU resources; and
computer memory.

* * * * *